United States Patent

Arai

[11] Patent Number: 6,027,179
[45] Date of Patent: Feb. 22, 2000

[54] EMERGENCY STOP APPARATUS FOR HYDRAULIC SPEED CHANGE GEAR

[75] Inventor: Mitsuru Arai, Oyama, Japan

[73] Assignee: Komatsu Ltd., Tokyo, Japan

[21] Appl. No.: 09/021,438

[22] Filed: Feb. 10, 1998

[51] Int. Cl.[7] .............................. B60T 13/18; B60T 13/14
[52] U.S. Cl. .................... 303/11; 303/2; 180/306
[58] Field of Search ..................... 180/305, 306, 180/307, 308, 277, 275, 280; 303/10, 11, 9, 2, 3; 192/71, 93 C, 91 R, 91 A

[56] References Cited

U.S. PATENT DOCUMENTS

| | | | |
|---|---|---|---|
| 4,620,575 | 11/1986 | Cuba et al. | 180/307 |
| 4,628,690 | 12/1986 | Arai et al. | 60/464 |
| 4,712,377 | 12/1987 | Yoshida et al. | 60/444 |
| 4,759,185 | 7/1988 | McConnell et al. | 180/306 |
| 5,103,944 | 4/1992 | Severinsson | 192/93 C |
| 5,492,511 | 2/1996 | Kozminski | 477/27 |
| 5,542,891 | 8/1996 | Kettle, Jr. et al. | 477/96 |
| 5,884,984 | 3/1999 | Arai et al. | 303/11 |

FOREIGN PATENT DOCUMENTS 63-195154  12/1988  Japan .

*Primary Examiner*—Robert J. Oberleitner
*Assistant Examiner*—Robert A. Siconolfi
*Attorney, Agent, or Firm*—Sidley & Austin

[57] ABSTRACT

An emergency stop apparatus for a hydraulic speed change gear is capable of quickly reducing the pump discharge to zero in order to stop the traveling of a vehicle at the time of an emergency, where the vehicle employs a hydraulic travel drive system, such as in construction equipment, agricultural equipment, etc. The apparatus includes a variable capacity type hydraulic pump (41); a hydraulic motor (43); a travel operating level (59); an intermediate lever, which is connected to the travel operating lever by a wire cable; a servo valve (52); a servo valve input lever (57), which is attached to the servo valve; and an interlock device between the intermediate lever and the servo valve input lever. When the interlock device is engaged, the servo valve input lever is actuated according to the operation of the travel operating lever so as to displace the servo valve in accordance with the operating amount of the travel operating lever to increase or decrease the discharge of the variable capacity type hydraulic pump so as to change the rotational speed of the hydraulic motor. When the interlock device is disengaged, the servo valve input lever is not connected to the intermediate lever. An emergency stop switch can actuate a solenoid valve to pass pressurized oil to a detent means to effect disengagement of the servo valve input lever from the intermediate lever.

20 Claims, 4 Drawing Sheets

EMERGENCY STOP APPARATUS FOR HYDRAULIC SPEED CHANGE GEAR

FIELD OF THE INVENTION

The present invention relates to an emergency stop apparatus for a hydraulic speed change gear. In a particular aspect, the invention relates to an emergency stop apparatus for a speed change gear which is installed on a hydraulic travel drive system of construction equipment, agricultural equipment, etc.

BACKGROUND OF THE INVENTION

The general configuration of a conventional hydraulic speed change gear 40 is shown in FIG. 5. A variable capacity type hydraulic pump 41 (hereinafter referred to as "the pump 41") and a pump 42 for a servo valve (hereinafter referred to as "the servo pump 42") are driven by a power source (not shown). The pump 41 is connected to a hydraulic motor 43 via hydraulic circuits 44 and 45. The pump 41 selectively discharges pressurized oil to one of these hydraulic circuits so as to enable the hydraulic motor 43 to turn in the forward direction or in the reverse direction. The maximum pressures of the respective hydraulic circuits 44 and 45 are limited by the relief valves 46 and 47; and the occurrence of negative pressure is prevented by the suction valves 48 and 49. The hydraulic motor 43 drives a travel drive wheel (not shown). The servo pump 42 is connected to a servo cylinder 53 via a conduit 51 and a servo valve 52, which controls the discharge of the pump 41. The servo valve 52 includes springs 52a and 52a at opposed end positions, and the servo cylinder 53 also includes springs 53a and 53a at opposed positions. When the servo valve 52 is not in operation, a servo valve input lever 57 (hereinafter referred to as "the link lever 57") is in a position where the tilt rotational angle of the pump 41 is zero. As the servo valve 52 moves according to the movement of the link lever 57, the servo cylinder 53 moves to its middle position between its left position D and its right position E; and the pump 41, which is interlocked with the servo cylinder 53, does not discharge pressurized oil. Hence, the hydraulic speed change gear 40 is at rest.

Connected to the servo valve 52 and the servo cylinder 53 are links 55 and 56, and the link lever 57. The link lever 57 is connected via a wire cable 58 to a travel operating lever 59, which is provided at a driver's seat (not shown).

The operation of the hydraulic speed change gear 40 will be described. When an operator operates the travel operating lever 59, the link lever 57, the link 55, and the servo valve 52 are operated via the wire cable 58. When the link lever 57 moves in the direction of the arrow from J to M about a fulcrum L relative to the link 56, a fulcrum K of the link lever 57 and the link 55 moves in the direction of the arrow from K to N accordingly, and the servo valve 52 shifts from its position A to its position C via the link 55. This causes the pressurized oil from the servo pump 42 to flow to the left position D of the servo cylinder 53, the fulcrum L to move in the direction of the arrow from L to R, and the tilt rotational angle of the pump 41, interlocked with the servo cylinder 53, to increase, thereby causing the pump 41 to discharge pressurized oil. As the link lever 57 moves back in the direction of an arrow from N to K, the servo valve 52 shifts from its position C to its center position A to cut off the flow of pressurized oil from the servo pump 42 to the servo cylinder 53, causing the servo cylinder 53 to stop in its current position (the position to which the fulcrum L has moved). In other words, the pump 41 discharges the amount of flow which corresponds to the shift amount of the travel operating lever 59. Thus, a vehicle travels at a predetermined speed which corresponds to the operating amount of the travel operating lever 59.

On the other hand, to bring the vehicle to an emergency stop in case of an emergency, the travel operating lever 59 is set back to the neutral point, thereby shifting the servo valve 52 from its position A to its position B. This causes pressurized oil from the servo pump 42 to flow to the right position E of the servo cylinder 53, and the pressurized oil on the side of position D to drain to a tank 60 via the servo valve 52. Thus, the tilt rotational angle of the pump 41, which is interlocked with the servo cylinder 53, is reset so that the pump 41 no longer discharges pressurized oil and the vehicle stops.

If the travel operating lever 59 is directly connected to the servo valve 52, then its operation is relatively satisfactory. Generally, however, the servo valve 52 is directly connected to the pump 41 or is disposed in the vicinity of the pump 41 to simplify the piping connection. Moreover, the pump 41 is disposed in the vicinity of a power source, so that the servo valve 52 cannot always be directly connected to the travel operating lever 59, which is located at the driver's seat. In such a case, the wire cable 58 is generally used to join the travel operating lever 59 to the servo valve 52. In construction equipment, agricultural equipment, etc., which handles stone, earth, or sand, there are cases where stone, earth, or sand is caught in the wire cable 58, and an operation failure takes place, leading to an extremely hazardous situation and posing a problem in that the vehicle cannot be stopped in case of an emergency.

There is another problem in that the time for stopping the vehicle differs according to the speed at which the operating lever 59 is reset. Hence, it is possible to achieve a quicker reset by increasing the tension of the springs 52a of the servo valve 52; however, this method poses a problem in that a higher operating force is required.

SUMMARY OF THE INVENTION

The present invention focuses attention on the problems of the prior art described above, and it is an object of the invention to provide an emergency stop apparatus for a hydraulic speed change gear which is capable of stopping travel of the vehicle by quickly reducing the discharge of a pump to zero when the travel of the vehicle employing a hydraulic travel drive system for construction equipment, agricultural equipment, etc., is to be brought to an emergency stop.

In a first aspect, the invention comprises a travel operating lever, which is connected to an intermediate lever via a wire cable; a servo valve input lever, which is attached to a servo valve and which operates according to the operation of the travel operating lever; an emergency stop apparatus, which is between the servo valve input lever and the travel operating lever and which disengages an interlock between the travel operating lever and the servo valve input lever upon receipt of an emergency command during travel of the vehicle; and a hydraulic speed change gear, which constitutes a hydraulic drive circuit with a variable capacity type hydraulic pump and a hydraulic motor and which displaces the servo valve in accordance with the operating amount of the travel operating lever to increase or decrease the discharge of the variable capacity type hydraulic pump so as to change the rotational speed of the hydraulic motor.

With such an arrangement, the travel operating lever and the servo valve input lever are selectively interlocked, thus enabling the traveling speed of the vehicle to be controlled as in the past. To make an emergency stop to obviate a danger during travel, in addition to the conventional method wherein the travel operating lever is reset to the neutral position, pressurized oil is used to disengage the interlock between the travel operating lever and the servo valve input lever. Thus, the servo valve is reset to the neutral position by the spring, and the discharge of the pump becomes zero.

As a result, even if the operation of the wire cable, which is connected to the travel operating lever at the driver's seat, should become impossible, the interlock between the travel operating lever and the servo valve input lever is disengaged to quickly reset the servo valve to its neutral position, thereby enabling an emergency stop to be implemented. This provides double safety measures.

In a second aspect, the invention comprises, in addition to the elements of the first aspect, a detent means which includes a ball, a piston, and a spring, and which enables the emergency stop apparatus to engage or disengage the interlock between the servo valve input lever and the travel operating lever; and a solenoid valve, which is actuated in response to a demand at the time of an emergency and which supplies pressurized oil to push the piston against the spring. In this arrangement, the travel operating lever and the servo valve input lever are selectively interlocked via a ball of the detent means by the force of the spring which pushes the piston, thus enabling the traveling speed of the vehicle to be controlled as in the past.

With such an arrangement, in the emergency stop apparatus, the piston moves upon receipt of the pressurized oil from the solenoid valve, which switches in response to a command in case of an emergency, so as to release the locking of the detent means by actuating the piston to move the ball along a tapered contour of the piston. Hence, in response to the operation of the travel operating lever, the interlock with the servo valve input lever is released and the servo valve quickly returns to its neutral position, enabling an emergency stop. Thus, the release of the interlock by the pressurized oil ensures quick actuation. Moreover, the use of the ball for the locking allows an extremely simple structure. Furthermore, since the direct connection to the servo valve is possible as in the prior art, no complicated coupling mechanism is required, permitting an extremely simple configuration.

In a third aspect, in addition to the elements of the first or second aspect of the invention, the invention supplies the pressurized oil for the servo cylinder, for increasing or decreasing the discharge of the variable capacity type hydraulic pump, and the pressurized oil for pushing the piston of the emergency stop apparatus from a common pressurized oil source.

With such an arrangement, the pressurized oil for pushing the piston of the emergency stop apparatus is supplied via the solenoid valve from the pressure source of the pressurized oil for the servo cylinder which increases or decreases the discharge of the variable capacity type hydraulic pump. The pilot hydraulic source of the emergency stop apparatus is shared with the servo pump so as to permit a simple configuration of the hydraulic circuit and to reduce the drive power with resultant energy saving.

BEST MODE FOR CARRYING OUT THE INVENTION

Figure 1:
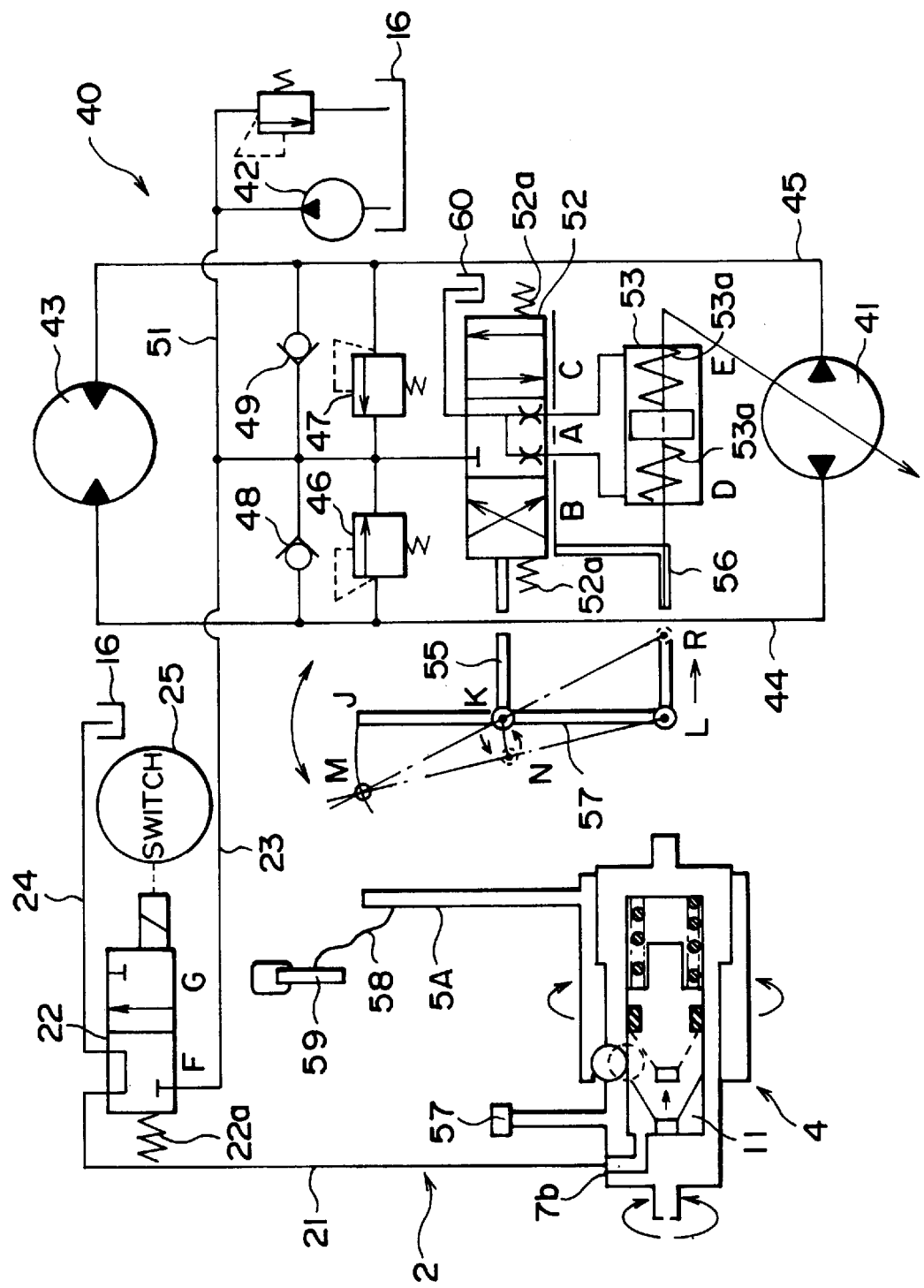
FIG. 1 is a general schematic view of a hydraulic speed change gear in accordance with an embodiment of the invention.

The following will describe an embodiment of a hydraulic speed change gear in accordance with the present invention with reference to the accompanying drawings. Like components will be assigned like reference numerals and a repetition of the description thereof will be omitted. FIG. 1 is a general schematic view of a hydraulic speed change gear wherein an emergency stop apparatus 2 is attached to a conventional hydraulic speed change gear 40, in accordance with an embodiment of the invention.

A interlock device 4, which is the detent means of the emergency stop apparatus 2, is provided between the travel operating lever 59 and the servo valve 52, which is located in the vicinity of the pump 41; and the wire cable 58 for transmitting an operating force is provided between the travel operating lever 59 and an intermediate lever 5A.

Figure 2:
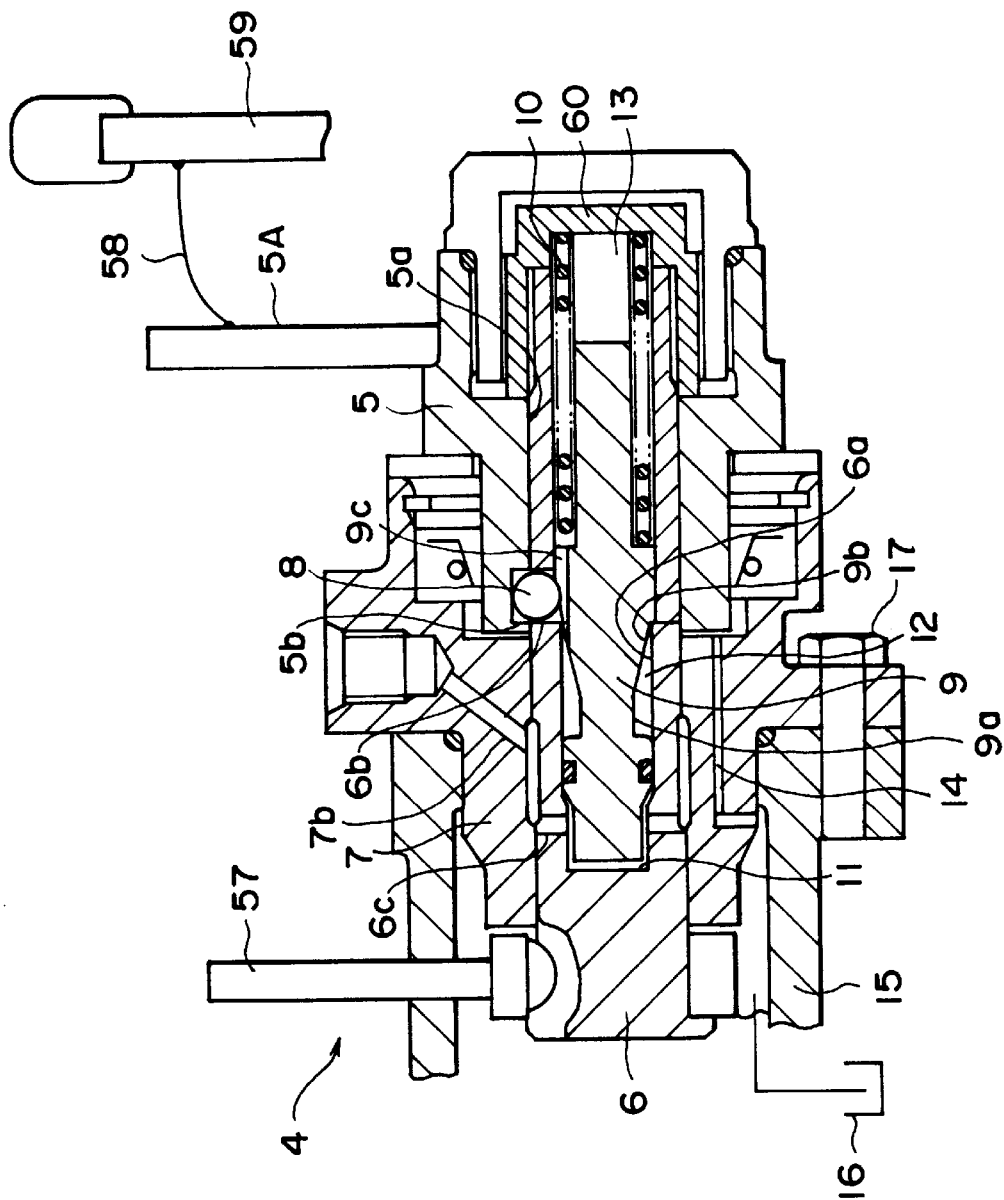
FIG. 2 is an enlarged cross sectional view of a detect section of an emergency stop apparatus shown in FIG. 1.

FIG. 2 is an enlarged sectional view of the interlock device 4. A housing body 7 for the detect section 4 is attached to the pump case 15 by at least one bolt 17, and has a central bore 7a which extends along the longitudinal axis of the housing body 7 with one end portion (the right end portion in FIG. 2) of the central bore 7a having a larger diameter than that of the opposite end portion (the left end portion in FIG. 2). A rotatable member in the form of a sleeve 5, having an inner bore 5a, is positioned at least partially inside the larger diameter end portion of the central bore 7a in the housing body 7 with the longitudinal axis of the sleeve 5 coinciding with the longitudinal axis of the central bore 7a in the housing body 7 so that the sleeve 5 is supported by the housing body 7 in the circumferential direction and so that the sleeve 5 can rotate with respect to the housing body 7 about the longitudinal axis of the sleeve 5. A rotatable member in the form of a shaft 6 is closely inserted in the smaller diameter end portion of the central bore 7a of the housing body 7 as well as in the inner bore 5a of the sleeve 5 such that the shaft 6 is supported by the housing body 7 and can rotate with respect to the housing body 7 in the circumferential direction about the longitudinal axis of the shaft 6. Three fixed grooves or cavities 5b are formed in the sleeve 5 at the entrance of the inner bore 5a, preferably at equal intervals in the circumferential direction, the entrance of the inner bore 5a being in the end of the sleeve 5 which is innermost in the large diameter end portion of the central bore 7a.

The intermediate lever 5A, which is connected to the travel operating lever 59 via the wire cable 58, is disposed at one end (the right end in FIG. 2) of the interlock device 4 and is connected to the outer periphery of the sleeve 5 so that movement of the intermediate lever 5A causes a rotation of the sleeve 5 about the longitudinal axis of the sleeve 5. Thus, the intermediate lever 5A and the sleeve 5 are rotatable as a single unit. The link lever 57, which is connected to the servo valve 52, is disposed at the other end (the left end in FIG. 2) of the interlock device 4 so that the link lever 57 extends through a slot in the pump case 15 and is fixed to the left end of the shaft 6 so that rotative movement of the shaft 6 causes a movement of the link lever 57. Thus, the link lever 57 and the shaft 6 are rotatable as a single unit. An internally threaded plug 60 is screwed onto the right end on the shaft 6. The link lever 57 and the plug 60 hold the housing body 7 and the sleeve 5 therebetween so as to restrict the axial movement of the sleeve 5 with respect to the housing body 7.

A piston bore 6a is formed in the shaft 6 such that the piston bore 6a is open at only one end (the right end in FIG. 2) so as to receive a piston 9 for longitudinal movement therein. Three guide apertures or cavities 6b are formed in a longitudinally central portion of the shaft 6 at equal intervals in the circumferential direction, with the apertures 6b extending from the piston bore 6a outwardly to the outer periphery of the shaft 6. The guide apertures 6b in the shaft 6 and the fixed grooves 5b of the sleeve 5 are located at the same positions in the longitudinal axis direction and are opposed to each other at the same positions in the circumferential direction. Each space defined by a guide aperture 6b and an associated fixed groove 5b is provided with a ball 8. The balls 8 function either to permit the shaft 6 and the sleeve 5 to rotate together as one piece or to prevent the shaft 6 and the sleeve 5 from rotating together as one piece. When each ball 8 is positioned in each of a respective guide aperture 6b and a respective fixed groove 5b, the interlock device 4 is in its engaged position, wherein the shaft 6 and the sleeve 5 are rotatable as a single unit. When each ball 8 is positioned in a guide aperture 6b but not in a fixed groove 5b, the interlock device 4 is in its disengaged position, wherein the shaft 6 and the sleeve 5 are separately rotatable.

The piston 9, which has a first or left end portion, an intermediate portion, and a second or right end portion, is closely and movably inserted in the piston bore 6a of the shaft 6 for movement along the longitudinal axis of the piston bore 6a. A spring 10 is provided between the right end portion of the piston 9 and the plug 60 so as to bias the piston 9 toward the left end of the shaft 6. With the piston 9 positioned in the piston bore 6a, the inner, closed end portion of the piston bore 6a and the associated left end of the piston 9 define a pressure receiving chamber 11. Pressurized oil is introduced into or drained from the pressure receiving chamber 11 via a shaft passageway 6c, which extends from the piston bore 6a to the exterior surface of the shaft 6, and an oil passageway 7b which is formed in the housing body 7 and which communicates with an oil inlet/outlet port 7c in the housing body 7. The diameter of the intermediate portion of the piston 9, viewed along the longitudinal length of the piston 9, is reduced to form a small diameter section 9a and a conically tapered section 9b, with the diameter of the conically tapered section 9b increasing from the small diameter section 9a toward the location of the balls 8 (i.e., away from the pressure receiving chamber 11). When pressurized oil is injected into the pressure receiving chamber 11, the piston 9 is caused to move rightwardly against the force of the spring 10 until the small diameter section 9a of the piston 9 reaches the longitudinal location of the balls 8 and the balls 8 enter the annular space defined by the small diameter section 9a and the tapered section 9b. The diameter of the small diameter section 9a is selected so that when the balls 8 and the small diameter section 9a are at the same longitudinal position, the balls 8 do not jut out of the guide apertures 6b in the shaft 6, i.e., they do no extend radially outwardly of the outer periphery of the shaft 6. When the balls 8 do not jut outwardly of the shaft 6, the sleeve 5 and the shaft 6 are not interlocked by the balls 8, and the interlock device 4 is in its disengaged position. Hence, when the balls 8 reach the small diameter section 9a, the shaft 6 and the sleeve 5 do not rotate together as one piece.

Formed also on the piston 9 is a longitudinally extending slit 9c for connecting the spring chamber 13 to the annular space 12, defined by the tapered section 9b and the small diameter section 9a. The spring chamber 13, where the spring 10 is housed, extends from the slit 9c to the plug 60. The guide apertures 6b, the fixed grooves 5b, the passageway 14 in the housing body 7, and the passageway 18 in the pump case 15 provide fluid communication between the spring chamber 13 and the drain tank 16. An O-ring 19 can be mounted between the exterior surface of the inner end portion of the piston 9 and the inner wall of the piston bore 6a so as to provide a fluid seal between the pressure receiving chamber 11 and the space 12.

Referring again to FIG. 1, a first port of a solenoid valve 22 is connected to the oil inlet/outlet 7c of the body 7 via a conduit 21. A second port of the solenoid valve 22 is connected to the servo pump 42 via the conduits 23 and 51. A third port of the solenoid valve 22 is connected by the conduit 24 to the drain tank 16. The solenoid valve 22 is normally set at its shutoff position F by a solenoid valve spring 22a. When the solenoid valve 22 is at its shutoff position F, there is fluid communication between the first and third ports such that conduit 21 is connected to the tank 16 via the conduit 24, so that the pressure receiving chamber 11 is set approximately at atmospheric pressure. On the other hand, when the solenoid valve 22 is at its communication position G, there is fluid communication between the first and second ports so that the pressure receiving chamber 11 is connected to the servo pump 42 via the conduits 21, 23, and 51; hence the pressure receiving chamber 11 is subjected to the pressurized oil from the servo pump 42. The pressurized oil acts on the piston 9 to move the piston 9 against the force of the spring 10, until the balls 8 and the small diameter section 9a are at the same longitudinal location. With the balls 8 retracted into the space 12, the shaft 6 and the sleeve 5 are not locked together and do not rotate as one piece.

Thus, when the pressure in the pressure receiving chamber 11 is a high value, the piston 6 is moved rightwardly against a force of the spring 10 until a disengaged position of the interlock device 4 is reached wherein each ball 8 is positioned within a respective guide aperture 6b and an annular space 12 defined by the intermediate portion of the piston 9 so that each ball 8 does not project outwardly beyond the outer periphery of the shaft 6 such that the shaft 6 is disengaged from the sleeve 5 so that they are separately rotatable. Similarly, when the pressure in the pressure receiving chamber 11 is a low value, i.e., approximately atmospheric pressure, the piston 9 is moved by the spring 10 toward the inner end of the piston bore 6a so that the increasing diameter of the tapered part of the intermediate portion of the shaft 6 causes each ball 8 to move out of the annular space 12 and be positioned within a respective guide aperture 6b and a respective groove 5b, thereby engaging the shaft 6 and the sleeve 5 so that they are rotatable as a single unit.

The solenoid of the solenoid valve 22 is electrically connected to the emergency stop switch 25, which is attached to the handle of the travel operating lever 59. When the emergency stop switch 25 is actuated (turned ON) by an operator, the solenoid valve 22 is shifted from its shutoff position F to its communication position G to supply pressurized oil to the pressure receiving chamber 11 in order to prevent the shaft 6 and the sleeve 5 rotating together as one piece. The interlock device 4 includes the sleeve 5, the shaft 6, the balls 8, the piston 9, and the spring 10.

The travel operation of the embodiment will now be explained in conjunction with FIGS. 1 and 2.

A first case, where no dangerous object is present in front of the vehicle and normal travel is performed, will be explained. In this case, the emergency stop switch 25 is released (OFF), so that the solenoid valve 22 is at its position F, and the pressure receiving chamber 11 of the emergency stop apparatus 2 is in communication with the tank 16 and is approximately at atmospheric pressure. As a result, the piston 9 is at its leftmost (innermost) position, due to the force of the spring 10, and the balls 8 are pushed outwardly by the top surface of the tapered shape 9b of the piston 9 and fitted into the fixed grooves 5b of the sleeve 5 and the guide apertures 6b of the shaft 6. Accordingly, the sleeve 5 and the shaft 6 are interlocked, so that the lever 5A, made integral with the sleeve 5, and the link lever 57, fixed to the shaft 6, are rotatable as one piece, causing the link lever 57 to shift according to the operating amount of the travel operating lever 59.

Hence, when the operator operates the travel operating lever 59, the intermediate lever 5A is actuated via the wire cable 58, and the link lever 57 is shifted accordingly, causing the servo valve 52 to shift from its position A to its position C; the hydraulic pressure of the servo pump 42 is transmitted to the position D of the servo cylinder 53, and the tilt rotational angle of the pump 41, interlocked with the servo cylinder 53, increases and pressurized oil is discharged.

The emergency stop operation will now be explained in conjunction with FIGS. 1, 2, 3, and 4.

Figure 3:
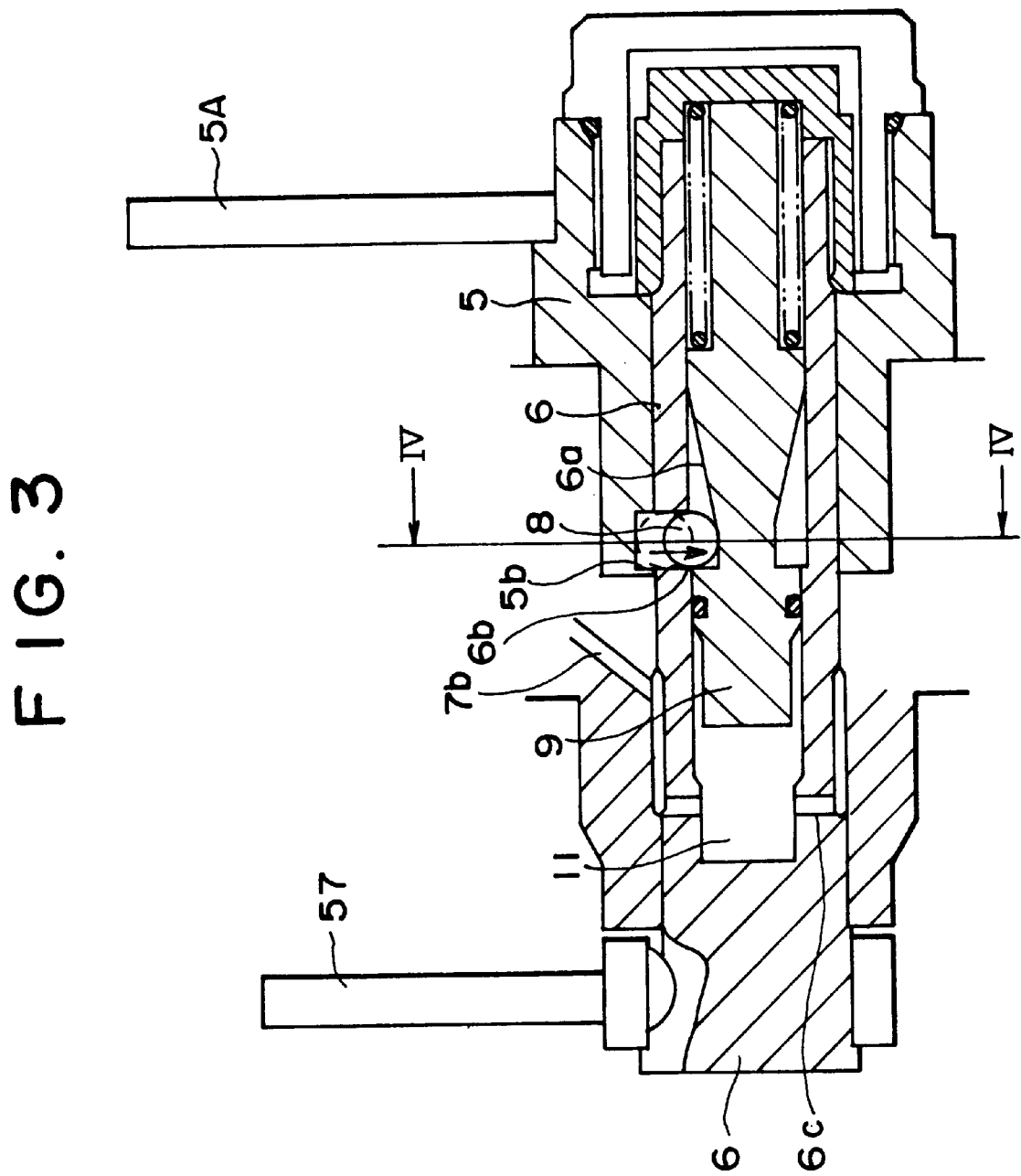
FIG. 3 is a cross sectional view illustrating the operation for releasing the locking of the interlocking device shown in FIG. 2.
Figure 4:
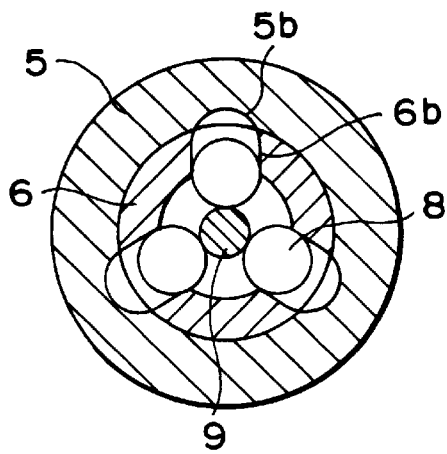
FIG. 4 is a cross sectional view taken at the line IV—IV in FIG. 3.
Figure 5:
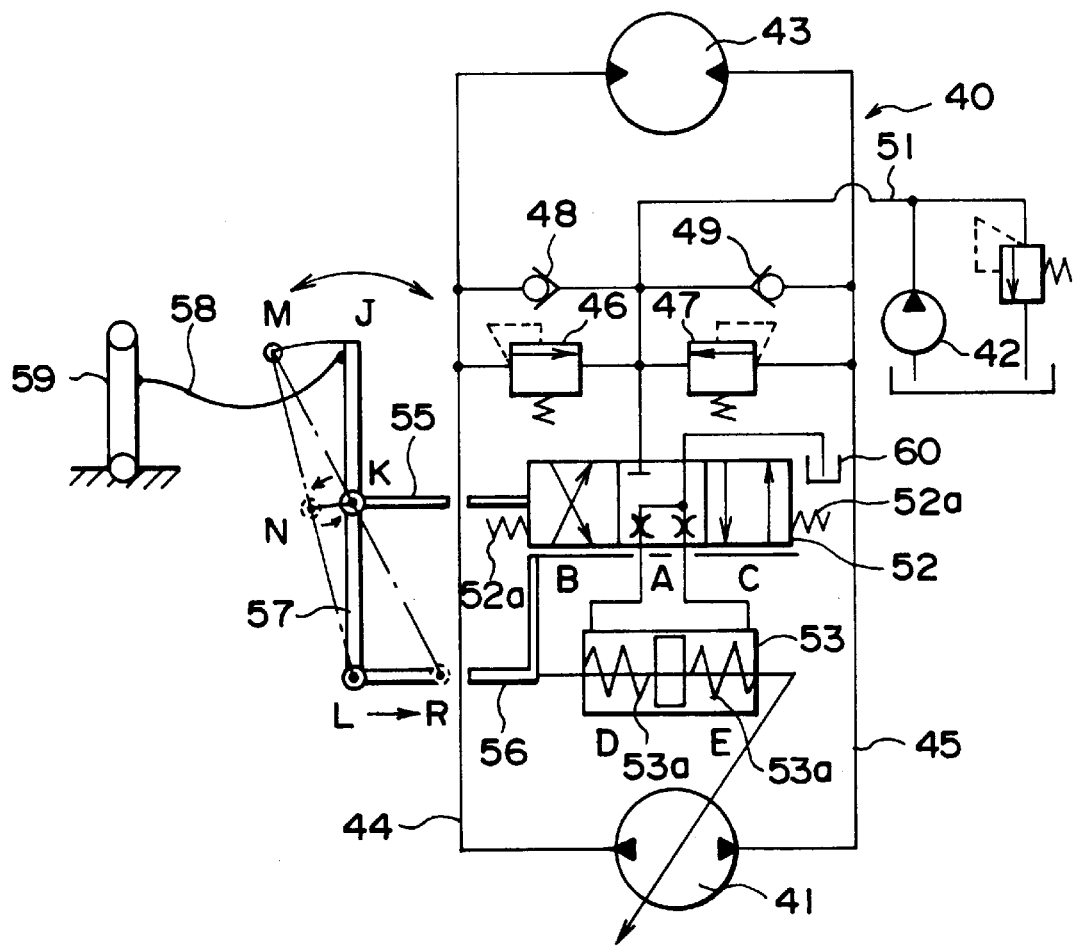
FIG. 5 is a general schematic view of a hydraulic speed change gear in accordance with a prior art.

If a hazardous object is present in front of the vehicle and an emergency stop must be implemented during travel, the operator turns ON the emergency stop switch 25, shown in FIG. 1, to switch the solenoid valve 22 to its position G, so that pressurized oil from the servo pump 42 is fed to the pressurized oil passageway 7b of the housing body 7, shown in FIG. 2, via the conduit 23, the solenoid valve 22, and the conduit 21. The pressurized oil flows through the shaft passageway 6c into the pressure receiving chamber 11 so as to move the piston 9 to the right against the force of the spring 10. This causes, as shown in FIGS. 3 and 4, the balls 8 to move toward the center of the shaft 6 along the tapered shape 9b of the piston 9 and away from the fixed grooves 5b of the sleeve 5; therefore, the interlock between the sleeve 5 and the shaft 6 is disengaged, so that the link lever 57 is no longer shifted according to the operating amount of the travel operating lever 59. Hence, even if the operation failure of the wire cable 58 should take place in case of an emergency when the travel of the vehicle must be stopped, pressing the emergency stop switch 25 disengages the link lever 57 which is in turn quickly moved to the position where the discharge of the pump 41 is zero, i.e., the tilt rotational angle is zero, by the spring 52a.

Thus, the servo valve 52, connected to the link lever 57, is switched from its neutral position A to its position B or its position C so as to move the servo cylinder 53 to the position where the discharge of the pump 41 is zero. And the servo cylinder 53 moves to the position where the discharge of the pump 41 is zero, i.e., the tilt rotational angle is zero. When the servo cylinder 53 reaches the position where the tilt rotational angle is zero, the servo valve 52 is switched by the link lever 57 to the neutral position A, and the motion of the servo cylinder 53 is stopped. As a result, the tilt rotational angle of the pump 41 becomes zero, i.e., the discharge becomes zero, and an emergency stop is implemented.

The springs 53a act so that the servo cylinder 53 reaches the position where the tilt rotational angle of the pump 41 is zero, and aid in the reset to the neutral position. For this reason, the springs 53a are functionally dispensable.

To restart the vehicle after an emergency stop, the operator sets the travel operating lever 59 back to the neutral position once to match the circumferential phases of the intermediate lever 5A, made integral with the sleeve 5, and the link lever 57, fixed to the shaft 6, (to bring the guide apertures 6b of the shaft 6 and the fixed grooves 5b of the sleeve 5 to the same longitudinal positions), then releases the emergency stop switch 25 (OFF) before operating the travel operating lever 59 in the desired advancing direction.

At this time, if the operator fails to set the travel operating lever 59 back to the neutral position once, then the link lever 57 is no longer shifted according to the operating amount of the travel operating lever 59, making it impossible to start the vehicle. Thus, since the vehicle cannot be advanced unless the travel operating lever 59 is set back to the neutral position once, even if the operator accidentally releases the emergency stop switch 25 (OFF), the vehicle will not be started, thus further enhancing the safety.

That which is claimed is:

1. Apparatus comprising:
    a hydraulic motor;
    a variable capacity type hydraulic pump for supplying pressurized oil to drive said hydraulic motor;
    a servo valve for increasing or decreasing discharge of pressurized oil from said variable capacity type hydraulic pump so as to change a rotational speed of said hydraulic motor;
    a servo valve input lever, which is attached to said servo valve;
    a travel operating lever;
    an intermediate lever, which is connected to said travel operating lever via a wire cable; and
    an interlock device which is connected to said intermediate lever and to said servo valve input lever, said interlock device having an engaged position and a disengaged position, whereby in said engaged position said interlock device causes said servo valve input lever to operate in accordance with an operating amount of said travel operating lever, and in said disengaged position said interlock device disconnects said servo valve input lever from said intermediate lever.

2. Apparatus in accordance with claim 1, further comprising an emergency stop switch;
    wherein said interlock device is actuated by said emergency stop switch in case of an emergency to cause said interlock device to move to its disengaged position.

3. Apparatus in accordance with claim 1, wherein said interlock device comprises:
    a detent means, for selectively connecting said servo valve input lever with said intermediate lever or disconnecting said servo valve input lever from said intermediate lever; and
    an actuation valve which supplies pressurized oil for actuating said detent means to disconnect said servo valve input lever from said intermediate lever.

4. Apparatus in accordance with claim 3, further comprising an emergency stop switch; and
    wherein said actuation valve is actuated by said emergency stop switch in case of an emergency so that said actuation valve supplies pressurized oil for causing said interlock device to move to its disengaged position.

5. Apparatus in accordance with claim 4, wherein said detent means includes at least one ball, a piston, and a spring; and
    wherein said actuation valve is actuated by said emergency stop switch in case of an emergency so that said actuation valve supplies pressurized oil for moving said piston against a force of said spring in order for said at least one ball to enter a disengaged position, thereby causing said interlock device to move to its disengaged position.

6. Apparatus in accordance with claim 4, wherein said detent means comprises:

a housing body having an inner bore;

a shaft rotatably positioned in said inner bore and supported by said housing body, said servo valve input lever being fixed to said shaft for movement therewith as a single unit, said shaft having a piston bore formed therein, said piston bore having a first end;

a sleeve positioned coaxially with a portion of said shaft, said sleeve having at least one groove in a surface facing said shaft, said intermediate lever being fixed to said sleeve for movement therewith as a single unit;

a piston positioned in said piston bore for movement along said piston bore, said piston having a first end portion, an intermediate portion, and a second end portion; a diameter of an end of said intermediate portion which is closer to said first end of said piston bore being smaller than a diameter of another end of said intermediate portion;

a spring biasing said piston towards said first end of said piston bore, a portion of said piston bore between said first end of said piston bore and said first end portion of said piston constituting a pressure receiving chamber;

a passageway in said shaft for providing fluid communication between an oil port and said pressure receiving chamber;

at least one guide aperture in said shaft extending from said piston bore outwardly to an outer periphery of said shaft at a longitudinal location along said shaft corresponding to a longitudinal location of said at least one groove in said sleeve; and each said guide aperture having a ball positioned therein;

wherein said actuation valve supplies pressurized oil to said oil port when said emergency stop switch is actuated;

whereby when pressure in said pressure receiving chamber is a high value, said piston is moved against a force of said spring until a disengaged position of said interlock device is reached wherein each ball is positioned within a respective guide aperture and an annular space defined by said intermediate portion of said piston so that each ball does not project outwardly beyond the outer periphery of said shaft such that said shaft is disengaged from said sleeve so that they are separately rotatable; and whereby when pressure in said pressure receiving chamber is a low value, said piston is moved by said spring toward said first end of said piston bore so that increasing diameter of said intermediate portion of said shaft causes each ball to move out of said annular space and be positioned within a respective guide aperture and a respective groove, thereby engaging said shaft and said sleeve so that they are rotatable as a single unit.

7. Apparatus in accordance with claim 6, wherein there is a spring chamber between said shaft and said second end portion of said piston and further comprising a fluid passageway between said spring chamber and an oil tank for passing oil from said spring chamber to said oil tank.

8. Apparatus in accordance with claim 7, wherein said fluid passageway includes a longitudinal slit in said piston extending from said spring chamber to said annular space defined by said intermediate portion of said piston.

9. Apparatus in accordance with claim 6, further comprising an O-ring positioned between a circumferential periphery of said first end portion of said piston and an inner wall of said piston bore in order to provide a fluid seal between said pressure receiving chamber and said annular space.

10. Apparatus in accordance with claim 6, further comprising a servo cylinder for varying the discharge of said variable capacity type hydraulic pump, and a common source of pressurized oil for supplying pressurized oil via said servo valve to the servo cylinder to increase or decrease the discharge of said variable capacity type hydraulic pump and for supplying pressurized oil to said actuation valve for moving the piston.

11. Apparatus in accordance with claim 6, wherein said intermediate portion of said piston comprises a reduced diameter portion and a conically tapered portion.

12. Apparatus in accordance with claim 1, wherein said interlock device comprises:

a first rotatable member, said servo valve input lever being fixed to said first rotatable member for movement therewith as a single unit, said first rotatable member having a first interlock cavity;

a second rotatable member, said intermediate lever being fixed to said second rotatable member for movement therewith as a single unit, said second rotatable member having a second interlock cavity;

a ball having an engaged position, wherein the ball is positioned in each of said first and second interlock cavities so that said first and second rotatable members rotate as a single unit, and a disengaged position, wherein the ball is positioned in only one of said first and second interlock cavities so that said first and second rotatable members are separately rotatable.

13. Apparatus in accordance with claim 12, further comprising a piston for moving said ball between the engaged position of said ball and the disengaged position of said ball; and an actuation valve for applying pressurized oil to said piston to cause said piston to move said ball to the disengaged position of said ball.

14. Apparatus in accordance with claim 13, further comprising an emergency stop switch;

wherein said actuation valve is actuated by said emergency stop switch in case of an emergency to cause said piston to move said ball to the disengaged position of said ball, thereby permitting said first and second rotatable members to be separately rotatable.

15. Apparatus in accordance with claim 14, further comprising a servo cylinder for varying the discharge of said variable capacity type hydraulic pump, and a common source of pressurized oil for supplying pressurized oil via said servo valve to the servo cylinder to increase or decrease the discharge of said variable capacity type hydraulic pump and for supplying pressurized oil to said actuation valve for moving the piston.

16. Apparatus in accordance with claim 1, wherein said interlock device comprises:

a housing body having an inner bore;

a shaft rotatably positioned in said inner bore and supported by said housing body, said servo valve input lever being fixed to said shaft for movement therewith as a single unit, said shaft having a piston bore formed therein, said piston bore having a first end;

a sleeve positioned coaxially with a portion of said shaft, said sleeve having at least one groove in a surface facing said shaft, said intermediate lever being fixed to said sleeve for movement therewith as a single unit;

a piston positioned in said piston bore for movement along said piston bore, said piston having a first end portion, an intermediate portion, and a second end portion; a diameter of an end of said intermediate portion which is closer to said first end of said piston bore being smaller than a diameter of another end of said intermediate portion;

a spring biasing said piston towards said first end of said piston bore, a portion of said piston bore between said first end of said piston bore and said first end portion of said piston constituting a pressure receiving chamber;

a passageway in said shaft for providing fluid communication between an oil port and said pressure receiving chamber;

at least one guide aperture in said shaft extending from said piston bore outwardly to an outer periphery of said shaft at a longitudinal location along said shaft corresponding to a longitudinal location of said at least one groove in said sleeve; and each said guide aperture having a ball positioned therein;

whereby when pressure in said pressure receiving chamber is a high value, said piston is moved against a force of said spring until a disengaged position of said interlock device is reached wherein each ball is positioned within a respective guide aperture and an annular space defined by said intermediate portion of said piston so that each ball does not project outwardly beyond the outer periphery of said shaft such that said shaft is disengaged from said sleeve so that they are separately rotatable; and whereby when pressure in said pressure receiving chamber is a low value, said piston is moved by said spring toward said first end of said piston bore so that increasing diameter of said intermediate portion of said shaft causes each ball to move out of said annular space and be positioned within a respective guide aperture and a respective groove, thereby engaging said shaft and said sleeve so that they are rotatable as a single unit.

17. Apparatus in accordance with claim 16, further comprising a servo cylinder for varying the discharge of said variable caopacity type hydraulic pump, and a common source of pressurized oil for supplying pressurized oil via said servo valve to the servo cylinder to increase or decrease the discharge of said variable capacity type hydraulic pump and for supplying pressurized oil to said oil port for moving the piston.

18. Apparatus in accordance with claim 16, wherein said intermediate portion of said piston comprises a reduced diameter portion and a conically tapered portion.

19. Apparatus in accordance with claim 16, further comprising an O-ring positioned between a circumferential periphery of said first end portion of said piston and an inner wall of said piston bore in order to provide a fluid seal between said pressure receiving chamber and said annular space.

20. Apparatus in accordance with claim 16, wherein there is a spring chamber between said shaft and said second end portion of said piston; further comprising a fluid passageway between said spring chamber and an oil tank for passing oil from said spring chamber to said oil tank, and wherein said fluid passageway includes a longitudinal slit in said piston extending from said spring chamber to said annular space defined by said intermediate portion of said piston.

* * * * *

UNITED STATES PATENT AND TRADEMARK OFFICE
CERTIFICATE OF CORRECTION

PATENT NO. : 6,027,179
DATED : February 22, 2000
INVENTOR(S) : Mitsuru Arai

It is certified that error appears in the above-identified patent and that said Letters Patent is hereby corrected as shown below:

Cover page, [30] Foreign Application Priority Data, insert --February 10, 1997 [JP] Japan ... 9-41653--.

Column 12, line 11 (claim 17, line 3), delete "caopacity", and insert --capacity--.

Signed and Sealed this

Eighth Day of May, 2001

Attest:

NICHOLAS P. GODICI

Attesting Officer

Acting Director of the United States Patent and Trademark Office